BUCHNALL & JOHNSON.
Milk Cooler.
No. 54,105.
Patented Apr. 24, 1866.
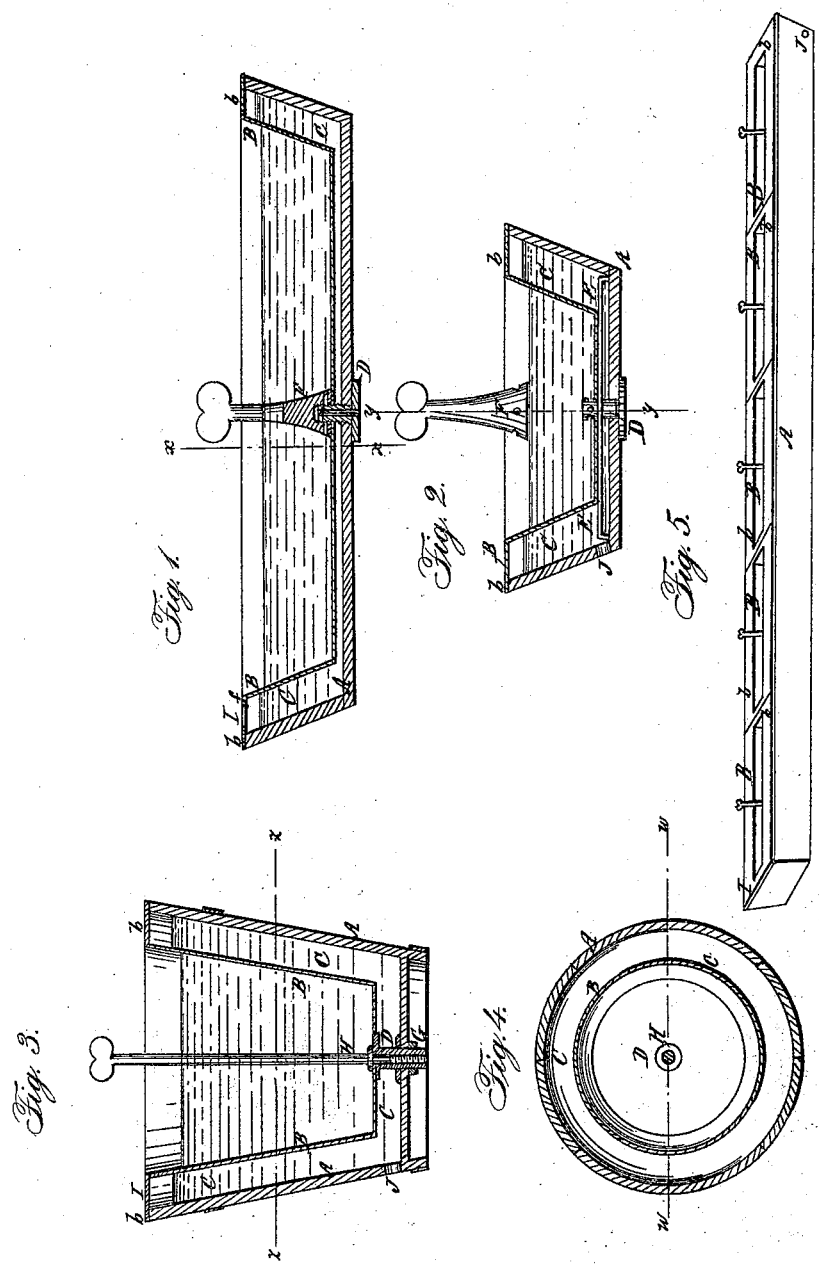

UNITED STATES PATENT OFFICE.

JOSEPH BURCHNALL AND J. T. JOHNSON, OF KALAMAZOO, MICHIGAN.

IMPROVED MILK AND CREAM REFRIGERATOR.

Specification forming part of Letters Patent No. 54,105, dated April 24, 1866.

*To all whom it may concern:*

Be it known that we, JOSEPH BURCHNALL and JOHN T. JOHNSON, of Kalamazoo, in the county of Kalamazoo and State of Michigan, have invented a new and useful Improvement in Milk and Cream Refrigerators; and we do hereby declare that the following is a full, clear, and exact description thereof, which will enable others skilled in the art to make and use the same, reference being had to the accompanying drawings, forming part of this specification, in which—

Figure 1 is a vertical longitudinal section of our improved refrigerator when made rectangular, taken through the line $yy$, Fig. 2. Fig. 2 is a vertical cross-section of the same, taken through the line $xx$, Fig. 1. Fig. 3 is a vertical central section of our improved refrigerator when made circular, taken through the line $ww$, Fig. 4. Fig. 4 is a horizontal cross-section of the same, raken through the line $zz$, Fig. 3. Fig. 5 is a perspective view of a modification of our invention adapting it to use in large dairies.

Similar letters of references indicate like parts.

Our invention has for its object the furnishing a means by which milk may be cooled, the quantity of cream increased, and consequently the quantity of butter increased and its quality improved; and it consists of a water-trough and milk-pan combined with each other in such a way as to have a space or water-chamber between them, both pan and trough being provided with stop-cocks or their equivalent, by means of which the milk and water may be drawn from their receptacles and replaced, each independently of the other.

A is the outer or water trough, which may be made of wood or metal, as may be most convenient. In shape it may be rectangular, as shown in Figs. 1, 2, and 5, or circular, as shown in Figs. 3 and 4. Its size will depend upon the extent of the dairy in which it is required to be used. In some cases it may be advisable to make the trough A small, having a trough for each pan. In others it may be more convenient and economical to make the trough large and capable of holding a series of pans, as indicated in Fig. 5.

B is the milk-pan, which is made of the same form as the trough A, and of such a size that when placed in the trough, as represented in the drawings, a space or chamber, C, may be left between the sides and bottom of the pan B and the sides and bottom of the trough A, as shown. The upper edge of the pan B is bent out, so as to form projecting edges or flanges $b$, which rest upon the upper edge of the trough A, as represented, and support the said pan B. The pan B is further supported by flanges formed on the discharge-pipe D. If the pan is large it may be still further supported by stays E, one of which is shown in Fig. 2. For convenience in drawing off the milk or cream from the pan a hole is made through the bottom of the pan and trough, through which passes a small pipe, D. This may be arranged in different ways. Thus in Figs. 1 and 2 the pipe D is represented as extending a little above the bottom of the pan B, and having holes through its sides for the passage of the milk. In this case the discharge of the milk is controlled by a nut, F, with a long handle. This nut has holes through its sides, which correspond with the holes in the pipe D. When the nut is in one position the holes in the nut F and pipe D are in a line and the milk flows through; but when the nut is slightly turned the holes in the pipe D are covered and the milk cannot escape through the pipe. In Fig. 3 the pipe is represented as being securely attached to the bottom of the pan, as having a flange resting upon the bottom of the trough A, and as being kept in place by a nut, G. In this case the escape of the milk is restrained by a plug, H, with a long handle which fits into the upper end of the pipe, as shown; or the discharge of the milk or cream may be controlled by stop-cocks attached to the pipe D, or in any other convenient way. The water may be introduced through the hole I in the flange $b$ of the pan, and may be drawn out through the hole J in the side of the trough A, the temperature of both milk and water being regulated by the use of a thermometer.

When the trough A is made large to contain a series of pans, B, it should have timbers or slats extending across the trough for the contiguous edges of the adjacent pans to rest upon. In some cases it may be necessary to further secure the pans B to the troughs by springs, buttons, or equivalents, to guard against the upward pressure of the water when the milk is withdrawn from the pan.

We claim as new and desire to secure by Letters Patent—

The combination of the trough A, pan B, perforated pipe D, and nuts F, whose holes register therewith, and operating in the manner and for the purpose herein specified.

JOSEPH BURCHNALL.
JOHN T. JOHNSON.

Witnesses:
ROLLIN WOOD,
JOSEPH MOORE.